US011013209B2

(12) United States Patent
Krone

(10) Patent No.: US 11,013,209 B2
(45) Date of Patent: *May 25, 2021

(54) MILKING CLUSTER AND MILKING PARLOR HAVING SUCH A MILKING CLUSTER

(71) Applicant: GEA Farm Technologies GmbH, Bönen (DE)

(72) Inventor: Otto Krone, Ibbenbüren (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,187

(22) Filed: May 4, 2018

(65) Prior Publication Data

US 2018/0249670 A1   Sep. 6, 2018

Related U.S. Application Data

(62) Division of application No. 14/002,610, filed as application No. PCT/EP2011/054163 on Mar. 18, 2011, now Pat. No. 9,968,069.

(51) Int. Cl.
| | | |
|---|---|---|
| *A01J 5/00* | (2006.01) | |
| *A01J 5/04* | (2006.01) | |
| *A01J 7/00* | (2006.01) | |
| *A01J 5/017* | (2006.01) | |
| *A01K 1/12* | (2006.01) | |

(52) U.S. Cl.
CPC ............. *A01J 5/00* (2013.01); *A01J 5/017* (2013.01); *A01J 5/0175* (2013.01); *A01K 1/12* (2013.01)

(58) Field of Classification Search
CPC . A01J 5/00; A01J 5/017; A01J 5/0175; A01K 1/12
See application file for complete search history.

(56) References Cited

U.S. PATENT DOCUMENTS

| | | | | |
|---|---|---|---|---|
| 1,525,837 | A * | 2/1925 | Walker | B60S 5/04 242/157 R |
| 2,357,373 | A | 9/1944 | Anderson | |
| 3,100,475 | A * | 8/1963 | Edge | A01J 5/044 119/14.11 |
| 3,448,725 | A | 6/1969 | Holm et al. | |
| 3,861,355 | A | 1/1975 | Johnson et al. | |

(Continued)

FOREIGN PATENT DOCUMENTS

| | | |
|---|---|---|
| DE | 3931769 | 4/1991 |
| DE | 4101530 A1 | 7/1992 |

(Continued)

OTHER PUBLICATIONS

Final Office Action dated Sep. 21, 2018, U.S. Appl. No. 14/384,678, 23 pages.

(Continued)

*Primary Examiner* — Kimberley S Wright
(74) *Attorney, Agent, or Firm* — Smith Law Office; Jeffry W. Smith

(57) ABSTRACT

A milking cluster used for milking a dairy animal in a milking parlor, the milking cluster including a teat cup unit, a teat cup, a drive device, a hose arrangement joined to the teat cup, a hose guide engaging the hose arrangement, and the hose guide includes a plurality of hose-engaging rollers.

24 Claims, 10 Drawing Sheets

(56) References Cited

U.S. PATENT DOCUMENTS

| | | | |
|---|---|---|---|
| 3,870,021 A | 3/1975 | Nederbragt | |
| 4,171,684 A | 10/1979 | Herr et al. | |
| 4,401,055 A | 8/1983 | Street et al. | |
| 4,459,940 A * | 7/1984 | Noorlander | A01J 5/041 |
| | | | 119/14.54 |
| 4,479,453 A * | 10/1984 | Bonassi | B63B 21/10 |
| | | | 114/218 |
| 4,508,058 A | 4/1985 | Jakobson et al. | |
| 4,838,207 A | 6/1989 | Fraas et al. | |
| 4,854,268 A * | 8/1989 | Kipe | A01K 1/12 |
| | | | 119/14.03 |
| 4,941,433 A | 7/1990 | Hanauer | |
| 5,042,428 A | 8/1991 | Van Der Lely et al. | |
| 5,056,466 A | 10/1991 | Dessing et al. | |
| 5,383,423 A | 1/1995 | Van Der Lely | |
| 5,524,572 A | 6/1996 | Dessing et al. | |
| 5,586,518 A | 12/1996 | Carrano | |
| 5,595,945 A | 1/1997 | Wicks | |
| 5,596,945 A | 1/1997 | Van Der Lely | |
| 5,606,932 A | 3/1997 | Van Der Lely | |
| 5,678,506 A | 10/1997 | Van Der Berg | |
| 5,697,324 A | 12/1997 | Van Der Lely | |
| 5,718,185 A | 2/1998 | Pichler et al. | |
| 5,718,186 A | 2/1998 | Van Der Lely | |
| 5,784,994 A | 7/1998 | Van Der Lely | |
| 5,826,536 A | 10/1998 | Van Der Lely et al. | |
| 5,862,776 A | 1/1999 | Van Den Berg | |
| 5,918,566 A | 7/1999 | Van Den Berg | |
| 5,950,561 A | 9/1999 | Redmond et al. | |
| 5,979,359 A | 11/1999 | Hansson | |
| 6,044,793 A | 4/2000 | Van Der Lely | |
| 6,050,219 A | 4/2000 | Van Der Lely | |
| 6,116,188 A | 9/2000 | Van Der Lely | |
| 6,148,766 A | 11/2000 | Van Der Lely | |
| 6,205,949 B1 | 3/2001 | Van Den Berg | |
| 6,213,051 B1 * | 4/2001 | Fransen | A01J 5/0175 |
| | | | 119/14.01 |
| 6,244,215 B1 | 6/2001 | Oosterling | |
| 6,269,766 B1 * | 8/2001 | Birk | A01J 5/017 |
| | | | 119/14.02 |
| 6,279,507 B1 | 8/2001 | Van Der Lely et al. | |
| 6,336,424 B1 * | 1/2002 | Kullberg | A01J 5/017 |
| | | | 119/14.2 |
| 6,357,387 B1 * | 3/2002 | Johannesson | A01J 5/0175 |
| | | | 119/14.1 |
| 6,363,883 B1 | 4/2002 | Birk | |
| 6,382,130 B1 | 5/2002 | Rooney | |
| 6,386,141 B1 | 5/2002 | Forsen et al. | |
| 6,532,893 B1 * | 3/2003 | Edholm | A01J 5/0175 |
| | | | 119/14.47 |
| 6,584,929 B2 | 7/2003 | Van Der Lely et al. | |
| 6,684,809 B1 * | 2/2004 | Sjolund | A01J 5/00 |
| | | | 119/14.08 |
| 6,814,027 B2 | 11/2004 | Hein et al. | |
| 6,814,224 B2 * | 11/2004 | Garbagnati | B29C 33/442 |
| | | | 198/852 |
| 6,843,203 B2 | 1/2005 | Johannesson et al. | |
| 7,104,218 B2 | 9/2006 | Teckentrup et al. | |
| 7,131,394 B2 | 11/2006 | Johannesson et al. | |
| 7,246,571 B2 | 7/2007 | Van Den Berg et al. | |
| 7,699,024 B2 * | 4/2010 | Rysewyk | A01J 5/0138 |
| | | | 119/14.08 |
| 7,762,405 B2 * | 7/2010 | Vogel | H04Q 1/068 |
| | | | 211/26 |
| 7,874,263 B2 * | 1/2011 | Schulte | A01K 1/12 |
| | | | 119/14.02 |
| 8,015,941 B2 | 9/2011 | Hallström | |
| 8,205,574 B2 * | 6/2012 | Danneker | A01J 5/0175 |
| | | | 119/14.47 |
| 8,210,122 B2 | 7/2012 | Pettersson et al. | |
| 8,281,744 B2 | 10/2012 | Van Den Berg | |
| 8,281,746 B2 | 10/2012 | Nilsson et al. | |
| 8,286,583 B2 * | 10/2012 | Van Den Berg | A01J 5/007 |
| | | | 119/14.02 |
| 8,393,296 B2 | 3/2013 | Hofman et al. | |
| 8,438,992 B2 | 5/2013 | Auburger | |
| 8,601,979 B2 * | 12/2013 | Van Der Sluis | A01K 1/12 |
| | | | 119/14.03 |
| 8,646,412 B2 | 2/2014 | Eriksson | |
| 8,670,867 B2 * | 3/2014 | Seaton | A01K 1/126 |
| | | | 700/245 |
| 8,704,396 B2 * | 4/2014 | Leijon | B66D 1/36 |
| | | | 290/53 |
| 9,107,378 B2 | 8/2015 | Hofman | |
| 9,161,512 B2 | 10/2015 | Hofman | |
| 9,215,858 B2 | 12/2015 | Johannesson et al. | |
| 9,215,861 B2 * | 12/2015 | Hofman | A01K 1/12 |
| 9,402,364 B2 * | 8/2016 | Seaton | A01J 5/0175 |
| 9,426,966 B2 | 8/2016 | Krone | |
| 9,491,924 B2 | 11/2016 | Hofman | |
| 9,549,530 B2 | 1/2017 | Harty et al. | |
| 9,681,634 B2 * | 6/2017 | Hofman | A01J 5/007 |
| 9,730,424 B2 | 8/2017 | Krone et al. | |
| 9,848,576 B2 | 12/2017 | Krone et al. | |
| 9,918,450 B2 | 3/2018 | Krone et al. | |
| 10,154,645 B2 * | 12/2018 | Foresman | A01J 5/007 |
| 10,440,931 B2 | 10/2019 | Krone | |
| 10,694,717 B2 | 6/2020 | Krone et al. | |
| 2001/0028021 A1 | 10/2001 | Martin | |
| 2002/0033137 A1 * | 3/2002 | van der Lely | A01J 5/003 |
| | | | 119/14.1 |
| 2004/0168645 A1 * | 9/2004 | Deelstra | A01J 5/0175 |
| | | | 119/14.02 |
| 2005/0066904 A1 | 3/2005 | Berg et al. | |
| 2005/0072363 A1 | 4/2005 | Van Der Lingen et al. | |
| 2007/0277737 A1 | 12/2007 | Maier | |
| 2008/0178811 A1 | 7/2008 | Heinrich | |
| 2009/0007850 A1 | 1/2009 | Mehinovic | |
| 2010/0058990 A1 * | 3/2010 | Danneker | A01J 5/0175 |
| | | | 119/14.47 |
| 2010/0186676 A1 | 7/2010 | Van Den Berg | |
| 2010/0326361 A1 | 12/2010 | Van Den Berg | |
| 2011/0048329 A1 * | 3/2011 | Van Den Berg | A01J 5/007 |
| | | | 119/14.08 |
| 2011/0114024 A1 | 5/2011 | Van Den Berg | |
| 2012/0055408 A1 | 3/2012 | Van Der Sluis et al. | |
| 2013/0061807 A1 * | 3/2013 | Axelsson | A01J 5/0175 |
| | | | 119/14.04 |
| 2013/0112145 A1 * | 5/2013 | Carroll | A01J 5/0175 |
| | | | 119/14.08 |
| 2014/0060436 A1 | 3/2014 | Krone | |
| 2015/0020738 A1 | 1/2015 | Krone et al. | |
| 2015/0020739 A1 | 1/2015 | Krone et al. | |
| 2015/0059649 A1 | 3/2015 | Van Der Sluis | |
| 2015/0189854 A1 | 7/2015 | Krone et al. | |
| 2015/0296737 A1 | 10/2015 | Krone et al. | |
| 2017/0042110 A1 | 2/2017 | Krone et al. | |
| 2017/0086419 A1 | 3/2017 | Krone | |
| 2018/0020632 A1 | 1/2018 | Krone et al. | |

FOREIGN PATENT DOCUMENTS

| | | |
|---|---|---|
| DE | 4113700 A1 | 10/1992 |
| DE | 4237949 A1 | 5/1994 |
| DE | 4339131 A1 | 5/1995 |
| DE | 29522237 | 12/2000 |
| DE | 102006027919 | 12/2006 |
| DE | 102006049948 A1 | 4/2007 |
| DE | 102008063751 A1 | 7/2009 |
| DE | 202012005042 U1 | 10/2013 |
| DE | 60106877 T3 | 6/2014 |
| EP | 0576085 A2 | 12/1993 |
| EP | 0647390 | 4/1995 |
| EP | 0647391 A2 | 4/1995 |
| EP | 0689762 A1 | 1/1996 |
| EP | 0736246 A1 | 10/1996 |
| EP | 0734649 A2 | 3/1997 |
| EP | 0811319 | 12/1997 |
| EP | 0657097 | 2/2002 |
| EP | 0862360 | 3/2003 |
| EP | 1084611 B1 | 9/2004 |
| EP | 0551960 | 9/2006 |

(56) References Cited

FOREIGN PATENT DOCUMENTS

| | | |
|---|---|---|
| EP | 1263283 B2 | 3/2014 |
| EP | 3335548 A1 | 6/2018 |
| GB | 1383038 | 2/1975 |
| RU | 2244417 C2 | 1/2005 |
| RU | 2279796 C2 | 7/2006 |
| WO | 93/13651 | 7/1993 |
| WO | 94/23565 | 10/1994 |
| WO | 96/01041 | 1/1996 |
| WO | 96/07314 | 3/1996 |
| WO | 96/19916 | 7/1996 |
| WO | 96/19917 | 7/1996 |
| WO | 98/04121 | 2/1998 |
| WO | 98/05201 | 2/1998 |
| WO | 98/31212 | 7/1998 |
| WO | 98/46069 A1 | 10/1998 |
| WO | 00/13492 A1 | 3/2000 |
| WO | 00/13495 | 3/2000 |
| WO | 01/67852 A1 | 9/2001 |
| WO | 02/15676 | 2/2002 |
| WO | 2008/030084 A2 | 3/2008 |
| WO | 2008/118068 A1 | 10/2008 |
| WO | 2010/052156 A1 | 5/2010 |
| WO | 2011/098454 A1 | 8/2011 |
| WO | 2011/098994 | 8/2011 |
| WO | 2013/135842 A1 | 9/2013 |

OTHER PUBLICATIONS

Final Office Action dated Sep. 21, 2018, U.S. Appl. No. 14/384,668, 24 pages.
Germania Home Page on Jul. 28, 2005, http://www.germaniadairy.com/, 1 page.
Boumatic Home Page on Jul. 28, 2005, http://www.bou-matic.com/html/gallery/rotary_curtin.htm, 2 pages.
WesffaliaSurge brochure "External Autorotor" dated Jan. 2001, 22 pages.
Germania sales brochure "Introducing—Profundly Productive PRO-TIME Parlors From Germania: Milking Parlors for the Next Century—And Beyond?" printed Nov. 1996, 8 pages.
Germania Dutch brochure "Vele Nederlandse melkveehouders ginge u voor!: Germania Melksystemen de trots van eleke veehouder", 6 pages.
"Offer of Germania milking systems VOF, Oude Lievervelderweg2. 7137 MA Lievelde, NL, to Mr Hummel, Am Milchweg 01,Ivenack, DE, dated Aug. 12, 1997, 10 pages."
"Fax cover sheet of a Germania milking system VOF fax,Lievelde, NL, sent to M. Hummel Jul. 10, 1997, 1 page."
Germania Final Quality Control/Inspection Certificate, dated Oct. 9, 1999, 1 page.
Germania technical drawing titled "Protime I Stall" dated May 10, 1997, 1 page.
Photos of a Germania double-herringbone parlor installed in Hummel GmbH cattle plant in 1999, 13 pages.
Westfalia Landtechnik GmbH advertising brochure "AutoRotor—Milk Carousel Systems" publication date Feb. 1997, 12 pages.
Westfalia Separator AG order confirmation and invoice dated Aug. 17, 1995, 22 pages.
Photos of a Westfalia Separator AG milking parlor installation at the Birkholz Estate, dated Sep. 2018, 7 pages.
"Reflections: A history of DeLaval" 5 pages.
International Search report for International Application No. PCT/EP2013/055265 dated May 28, 2013, 7 pages.
International Search report for International Application No. PCT/EP2013/055272 dated May 28, 2013, 9 pages.
International Search Report in for International Application No. PCT/EP2013/055288 dated May 24, 2013, 9 pages.
International Search Report for PCT Application No. PCT/EP2013/055270 dated May 28, 2013, 13 pages.
German Search Report dated Feb. 17, 2012 from German Patent Application No. 102011001404.7, 6 pages.
International Preliminary Report on Patentability and Written Opinion for PCT/EP2012/054645, English translation dated Sep. 24, 2013, 6 pages.
Non-Final Office Action dated Sep. 24, 2015, U.S. Appl. No. 14/002,076, 8 pages.
Non-Final Office Action dated Feb. 10, 2017, U.S. Appl. No. 15/247,544, 7 pages.
Non-Final Office Action dated Apr. 7, 2016, U.S. Appl. No. 14/002,610, 7 pages.
Non-Final Office Action dated Jun. 2, 2017, U.S. Appl. No. 14/002,610, 10 pages.
Final Office Action dated Dec. 19, 2016, U.S. Appl. No. 14/002,610, 6 pages.
Final Office Action dated Feb. 27, 2017, U.S. Appl. No. 14/384,678, 15 pages.
Non-Final Office Action dated Mar. 11, 2016, U.S. Appl. No. 14/384,678, 15 pages.
Non-Final Office Action dated Dec. 7, 2016, U.S. Appl. No. 14/384,676 15 pages.
International Search Report for PCT/EP2015/061087 dated Sep. 7, 2015, 7 pages.
Non-Final Office Action dated Oct. 26, 2017, U.S. Appl. No. 14/384,668, 23 pages.
Non-Final Office Action dated Jan. 4, 2018, U.S. Appl. No. 14/384,678, 29 pages.
German Search Report dated Feb. 2, 2015 for German Application No. 10 2014 107 124.7, 6 pages.
Extended European Search Report for EP Application No. 18154736 dated May 2, 2018, 1 page.
Non-Final Office Action dated Apr. 24, 2019, U.S. Appl. No. 14/384,678, 22 pages.
Non-Final Office Action dated Jun. 28, 2019, U.S. Appl. No. 14/384,668, 15 pages.
Non-Final Office Action dated Feb. 19, 2020, U.S. Appl. No. 15/720,405, 38 pages.
Ex Parte Quayle Action issued Mar. 6, 2020, U.S. Appl. No. 14/384,668, 17 pages.
Notice of Allowance dated Jul. 23, 2020, U.S. Appl. No. 14/384,668, 13 pages.
Final Office Action dated Aug. 4, 2020, U.S. Appl. No. 15/720,405, 19 pages.

* cited by examiner

MILKING CLUSTER AND MILKING PARLOR HAVING SUCH A MILKING CLUSTER

CROSS REFERENCE TO RELATED APPLICATIONS

This application is a divisional of U.S. application Ser. No. 14/002,610 filed Aug. 30, 2013, which is a national phase application under 35 U.S.C. § 371 of PCT International Application No. PCT/EP2011/054163 filed Mar. 18, 2011, the disclosures of which are incorporated by reference herein.

FIELD AND BACKGROUND OF THE INVENTION

The invention relates to a milking cluster for the automatic milking of milk-producing animals and to a milking parlor having such a milking cluster.

Document EP 0 862 360 B1 describes an apparatus for the automatic milking of animals, a teat cup being pulled into a cone by means of a cable which is mounted on the bottom of the teat cup. The cone is pivotable such that the teat cup is able to be pivoted under a covering.

Patent document EP 0647 391 B1 specifies a structure for the automatic milking of animals. A teat cup is mounted directly on the end of a loop-shaped line which can be divided into at least two portions. A first portion is connected to the teat cup and is relatively rigid, and a second portion is relatively flexible. The teat cup is held and guided additionally by means of a parallel guide, against which it can be tightened using a cable.

Against this background, the object of the invention consists in providing an improved arrangement as well as a milking parlor.

SUMMARY OF THE INVENTION

The invention comprises a milking cluster for a milking parlor for the milking of milk-producing animals, said milking cluster having at least one teat cup unit with a housing, a teat cup, a drive device and a hose arrangement which is connected to the teat cup, characterized in that the hose arrangement is guided by means of a hose guide which is pivotable in a fixed position and, in a position which differs from the fixed position, is freely movable within limits by means of a flexible element.

The at least one teat cup unit is movable out of a park position in which the teat cup assumes a position which is inclined with respect to the perpendicular, for example also horizontal, into a positioning position in which the teat cup is in a substantially perpendicular position, into a milking position in which the teat cup is connected to an associated teat of the animal to be milked, and back again.

The milking cluster can be moved, for example by a robot arm, in such a manner that the teat cups are moved individually out of the park position into a positioning position and in a milking position are suspended from the corresponding teats of the animal to be milked and at the end of the milking operation are removed from the teats, said teat cups initially being moved back into the positioning position and then into the park position.

Using the hose guide, it is possible, in this case, to obtain a large degree of free movement of the teat cup with a relatively small exposed length of the flexible element.

A further significant advantage is that any fouling of cables with adjacent teat cups is minimized.

As the flexible element is short and no further cables are used, neither additional rollers nor blocks and pulley arrangements are necessary.

Contamination of the teat cups is effectively prevented by means of the pivoted-round park position of the same.

Any teat cups that are trailing or have moved out of line or have even fallen down can be immediately moved back into the park position and consequently do not fall onto the ground and become contaminated.

The drive device of the at least one teat cup unit can at the same time be operatively connected to the hose arrangement and the hose guide, as a result of which a common movement sequence is maintained with a small number of parts.

In one position the drive device can exert a pulling force on the teat cup with the hose arrangement to assume the positioning position in abutment against the hose guide, wherein at the same time the hose guide is held in the fixed position, and in another position does not exert any pulling force on the teat cup, wherein at the same time the hose guide is released into the position which differs from the fixed position. The teat cup is connected only to the hose arrangement and does not require any additional cable.

In addition, it is possible for the teat cups, which are already in the milking position, to move in a lateral manner without exerting disruptive pulling forces on said teat cups which are in the milking position.

To this end, the drive device can be operatively connected to the hose arrangement by means of an adjustable guide roller and to the hose guide by means of a flexible element for moving the at least one teat cup unit from the positioning position into the milking position and back again into a positioning position.

In a preferred design, the drive device can be realized as an adjusting cylinder with a continuous piston rod, at the one end of which the guide roller is attached and at the other end of which the flexible element is attached. In this connection it is advantageous for the adjusting cylinder to require only a small stroke and little installation space, a cost saving also being possible.

The flexible element can be coupled with the piston rod by means of a force-storing element, as a result of which necessary length compensation is made possible during the adjustment.

In a further design, the at least one teat cup unit can have a pivot drive device for pivoting the teat cup out of the positioning position into the park position and back.

At the same time, the hose guide can be accommodatable in a pivotable fixing piece for assuming its fixed position and can be pivotable with the pivotable fixing piece by means of the pivot drive device into the park position and out of the park position into the positioning position. Said arrangement makes it possible for the hose arrangement to be pulled in for this purpose without an additional device being attached on the teat cup. As a result, a large degree of free mobility of the teat cup is possible.

The flexible element can be guided by a guide portion of the pivotable fixing piece, which provides for a compact design.

Further good mobility is produced when the hose guide has rollers for axially guiding the hose arrangement.

In a further design, the hose arrangement can have a multiple hose, for example a double hose, in which it is arranged at least in part. A compact design is achieved as a result, any fouling of hoses being further minimized.

A milking parlor for milking milk-producing animals can be provided with the above-described milking cluster.

The milking cluster, in this case, can be attached on a supporting arm device or a robot arm.

Advantageous further developments and developments of the milking cluster or of the milking parlor are the object of the respective dependent claims.

Further advantages and details proceed from the exemplary embodiment shown in the figures of the drawing, in which:

DETAILED DESCRIPTION OF THE INVENTION

Identical or similar function elements are provided with the identical references in the figures. A coordinate system x, y, z serves for better orientation.

Figure 1:
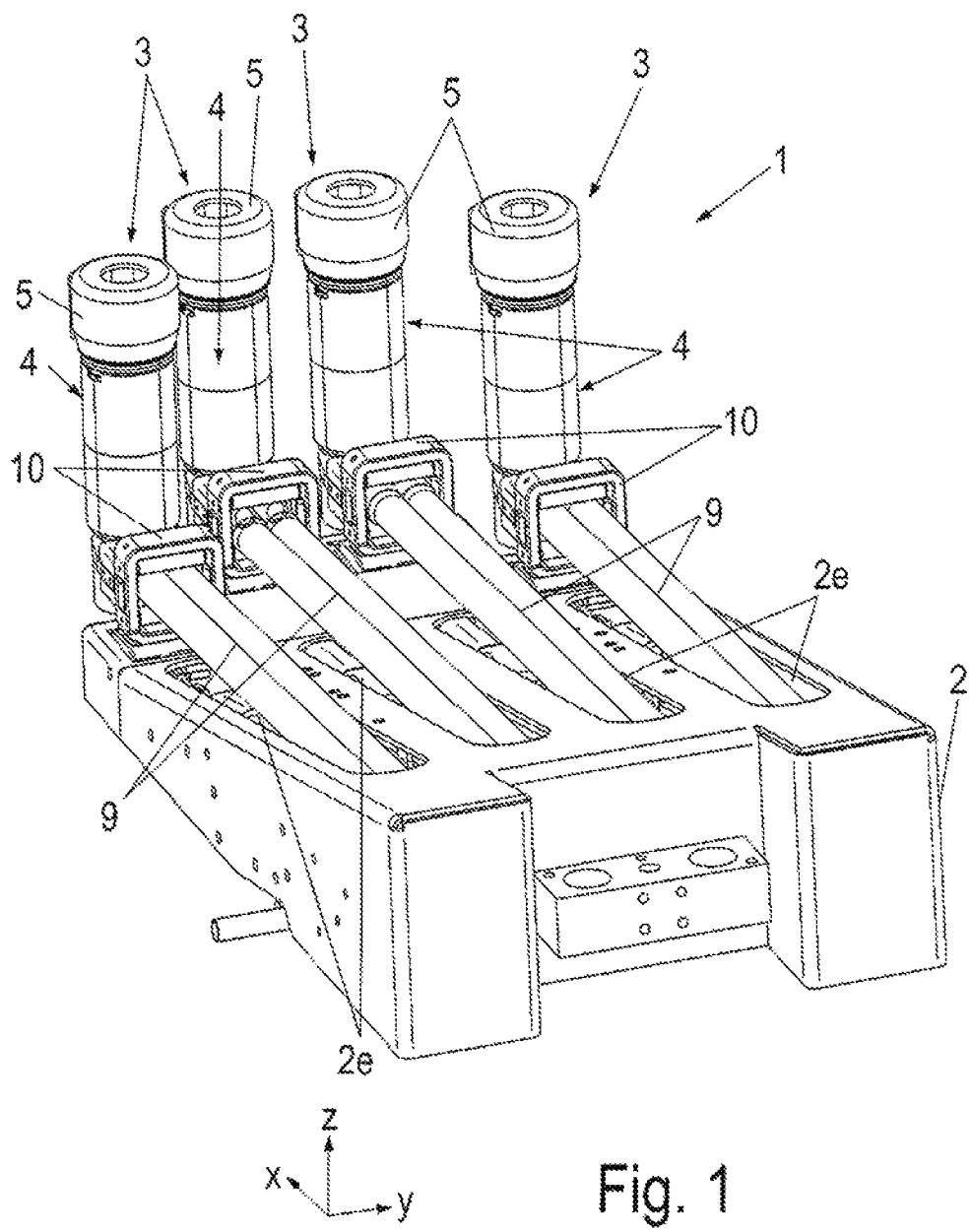
FIG. 1 shows a schematic perspective view of a milking cluster.

FIG. 1 shows a schematic perspective view of a milking cluster 1 as claimed in the invention.

The milking cluster 1, in this exemplary embodiment, has four teat cup units 3, which are arranged side by side in their longitudinal directions (in the x direction) and have a common housing 2 which will be described in more detail further below. Each of the four teat cup units 3, independently of the others, can assume one of three different positions which are explained individually below in detail.

For a better overall view, the four teat cup units 3 are shown in FIG. 1 in an upright, so-called positioning position, which will be described in conjunction with FIG. 2. In a so-called park position (see FIG. 3), the respective teat cup unit 3 is non-used and pivoted about the y axis out of the upright position. The third position is a so-called milking position which is shown in FIG. 4. For better differentiation, the teat cup unit 3 is provided with the reference 3 in the positioning position, with the reference 3' in the park position and with the reference 3" in the milking position.

Each teat cup unit 3 has a teat cup 4 with a teat rubber which has a head 5 and a shaft, and a fastening portion 6. The head 5 has a teat opening for the insertion of a teat (not shown). At a distance from the head 5, on the bottom end of the shaft is arranged the fastening portion 6 with a holder segment 7 which, in this exemplary embodiment, engages around the fastening portion 6 by way of a holder bracket 8 (other designs are naturally possible).

The holder segment 7 is connected to a double hose 9 which, in the interior thereof, guides individual hoses for vacuum application and milk suction. The double hose 9 is guided and held by a hose guide 10 and in its further longitudinal development is guided through an opening 2e in a top surface of the housing 2, which, in this exemplary embodiment, extends inclinedly, into the interior of said housing, which will be explained in more detail below. The housing 2 can also be, for example, stepped.

Figure 2:
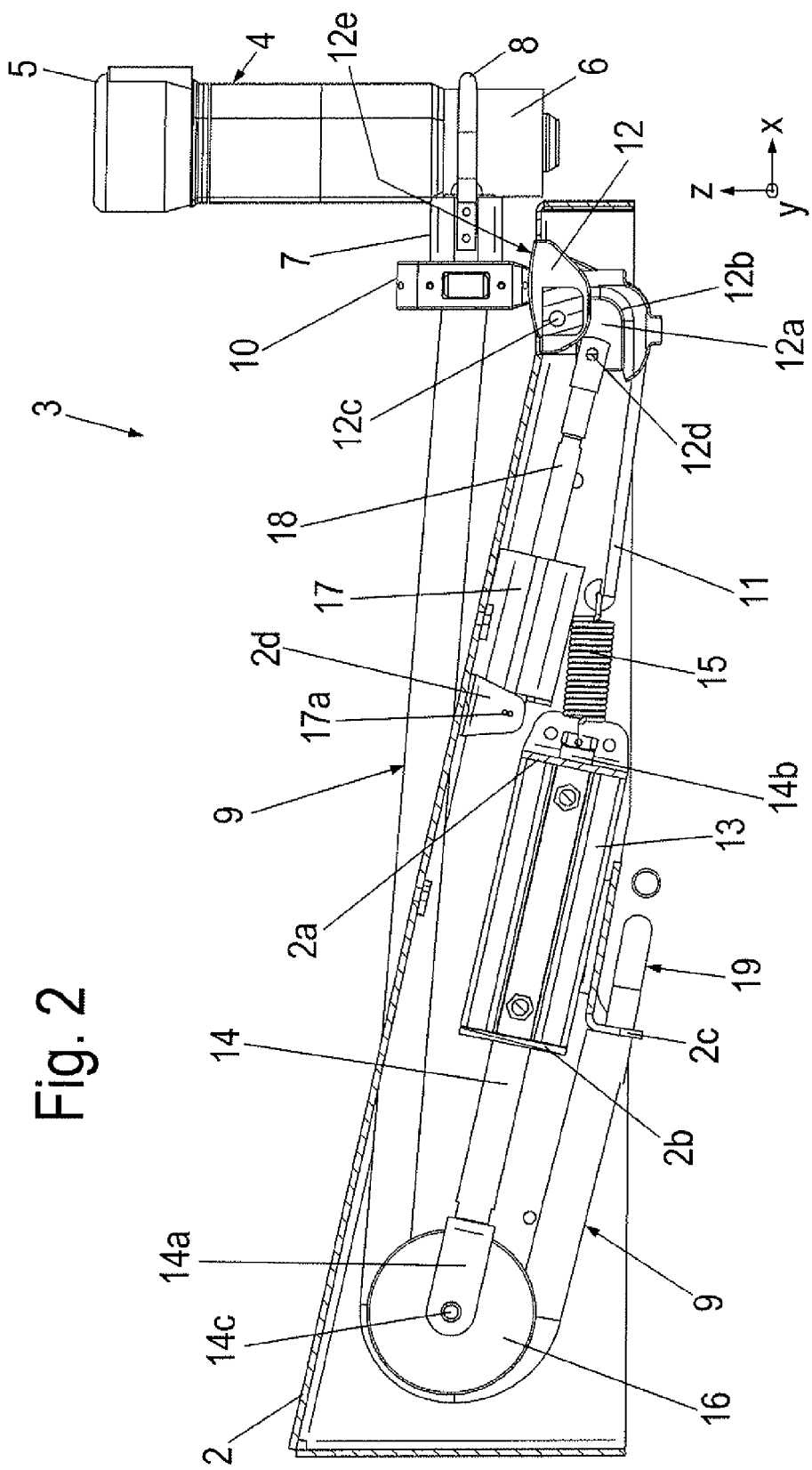
FIG. 2 shows a schematic longitudinal sectional representation of a teat cup unit of the milking cluster according to FIG. 1 in a positioning position.

FIG. 2 shows a schematic longitudinal sectional representation of a teat cup unit 3 of the milking cluster 1 according to FIG. 1 in a positioning position.

The positioning position serves the purpose of moving the teat cup 4 into a position which is fixed in relation to the robot arm in order then to suspend it from a corresponding teat of an animal to be milked. To this end, the milking cluster 1 is moved by way of a corresponding apparatus, for example a robot arm.

The portion of the housing 2, which is associated with the respective teat cup unit 3, in this exemplary embodiment is for instance trapezoidal in cross section in the x-z-plane as shown in FIG. 2, but is not limited to this. The top surface of the housing 2 with the openings 2e (FIG. 1) extends from a rear side of the housing 2, which is higher in the z-direction and is arranged in FIG. 2 on the left opposite the teat cup 4, inclinedly forward (on the right in FIG. 2) to a short front side.

The double hose 9, which is fastened on the teat cup 4 with one end by means of the holder segment 7, extends through the hose guide 10, the opening 2e of the housing 2 onto the rear side of the housing 2 and then about a guide roller 16 which is situated in the vicinity of the rear side of the housing 2 as far as up to a hose nipple holder 2c, on which the double hose 9 is fastened by way of its other end. The hose nipple holder 2c is fixedly connected to the housing 2. The direction of the double hose 9 is diverted about approximately 180° by the guide roller 16 and it then extends in the x-direction toward the front side of the housing 2. Hose nipples 19 are attached to the hose nipple holder 2c.

A drive device 13, in this case, for example, a pneumatic cylinder with a continuous piston rod 14, is fixedly attached above the hose nipple holder 2c to drive holders 2a, 2b which are fixedly connected to the housing. The piston rod 14 extends approximately parallel to the inclined top surface of the housing 2 which stands perpendicular to the drawing plane. The guide roller 16 is rotatably arranged in a guide roller axis 14c on the one end of the piston rod 14 which points to the rear side of the housing 2, in this case referred to as the pressure end 14a. The guide roller axis 14c is perpendicular to the drawing plane and extends in the y-direction.

A second end of the piston rod 14 projects out of the drive device 13 pointing toward the front side of the housing 2 and is connected to one end of a force-storing element 15, e.g. a tension spring. The other end of said tension spring is attached to a first end of a flexible element 11 which, for example, is a cable portion. The flexible element 11 extends inclinedly downward toward the front side of the housing 2 and is then deflected by approximately 90° in the z-direction at a guide portion 12b of a fixing piece 12. The end portion of the other end of the flexible element 11, deflected in this manner, passes through a receiving means 12e of the fixing piece 12 and is connected to the hose guide 10, which will be described in more detail further below. In this case, the hose guide 10 abuts by way of its foot part 10d (see FIG. 5) in the receiving means 12e and is held in said position by a tensile force of the flexible element 11.

The fixing piece 12 is fastened on the housing 2 so as to be pivotable about a pivot axis 12c and has a coupling portion 12a which is arranged with the guide portion 12b under pivot axis 12c. The pivot axis 12c, as the guide roller axis 14c, parallel to same, is perpendicular on the drawing plane and extends in the y-direction.

The coupling portion 12a of the fixing piece 12 is connected by means of a coupling axis 12d to one end of a pivot rod 18 of a pivot drive device 17. The pivot drive device 17 is, for example, a pneumatic cylinder and is connected to the housing 2 by means of a pivot drive coupling means 17a in a pivot drive holder 2d.

In the positioning position, the teat cup 4 is fixed abutting against the hose guide 10 by way of the holder segment 7 by the double hose 9 transferring onto the holder segment 7 a tensile force which is generated by the drive device 13. To this end, the piston rod 14 of the drive device 13 is extended toward the rear side of the housing 2 and tenses the double hose 9 toward the x-direction. A tension stress is built up at the same time as the double hose 9 is held by way of one end on the hose nipple holder 2c and by way of its other end by means of the holder segment 7 of the teat cup 4 which abuts against the hose guide 10. In addition, the fixing piece 12 is pivoted by the retracted pivot rod 18 of the pivot drive device 17 into such a position in which the hose guide 10 is perpendicular, i.e. is aligned in the z-direction. In this case, the form of the holder segment 7 abutting against the hose guide 10 achieves a holding of the teat cup 4 which extends in the z-direction and is aligned in a corresponding manner, the longitudinal axis of said teat cup consequently also lying in the z-direction.

As the piston rod 14 of the drive device 13 is extended toward the rear side of the housing 2, the tension spring 15 which is attached on the tension end 14b is tensed and at the same time generates a tensile force in the flexible element 11 which pulls the hose guide 10 fixedly into the receiving means 12e of the fixing piece and fixes it therein.

In other words, in the positioning position the drive device 13 with the continuous piston rod 14 brings about a fixing of the teat cup 4 on the hose guide 10 and a fixing of the hose guide 10 in the fixing piece 12.

Figure 3:
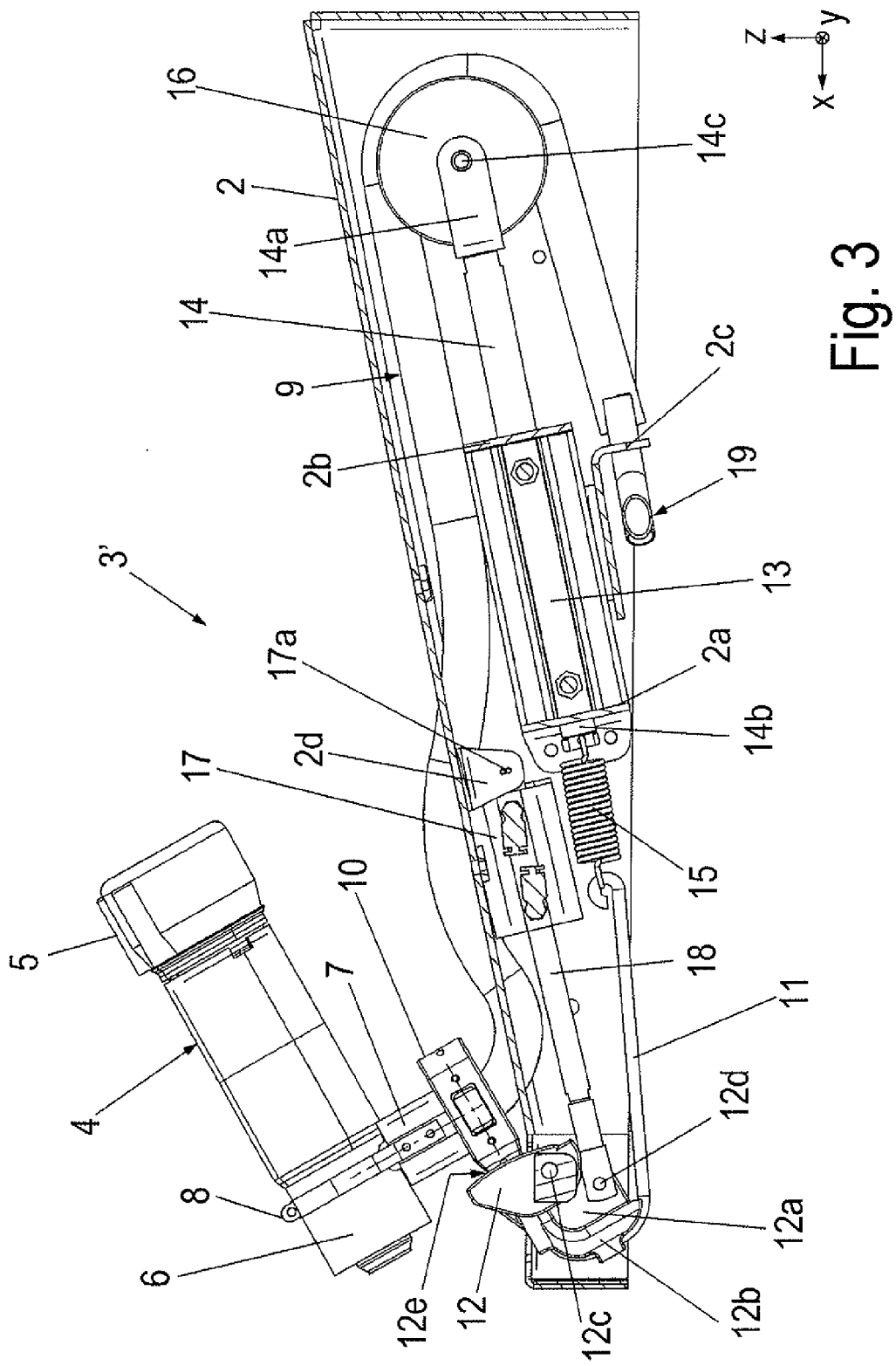
FIG. 3 shows a schematic longitudinal sectional representation of the teat cup unit of the milking cluster according to FIG. 1 in a park position.
Figure 4:
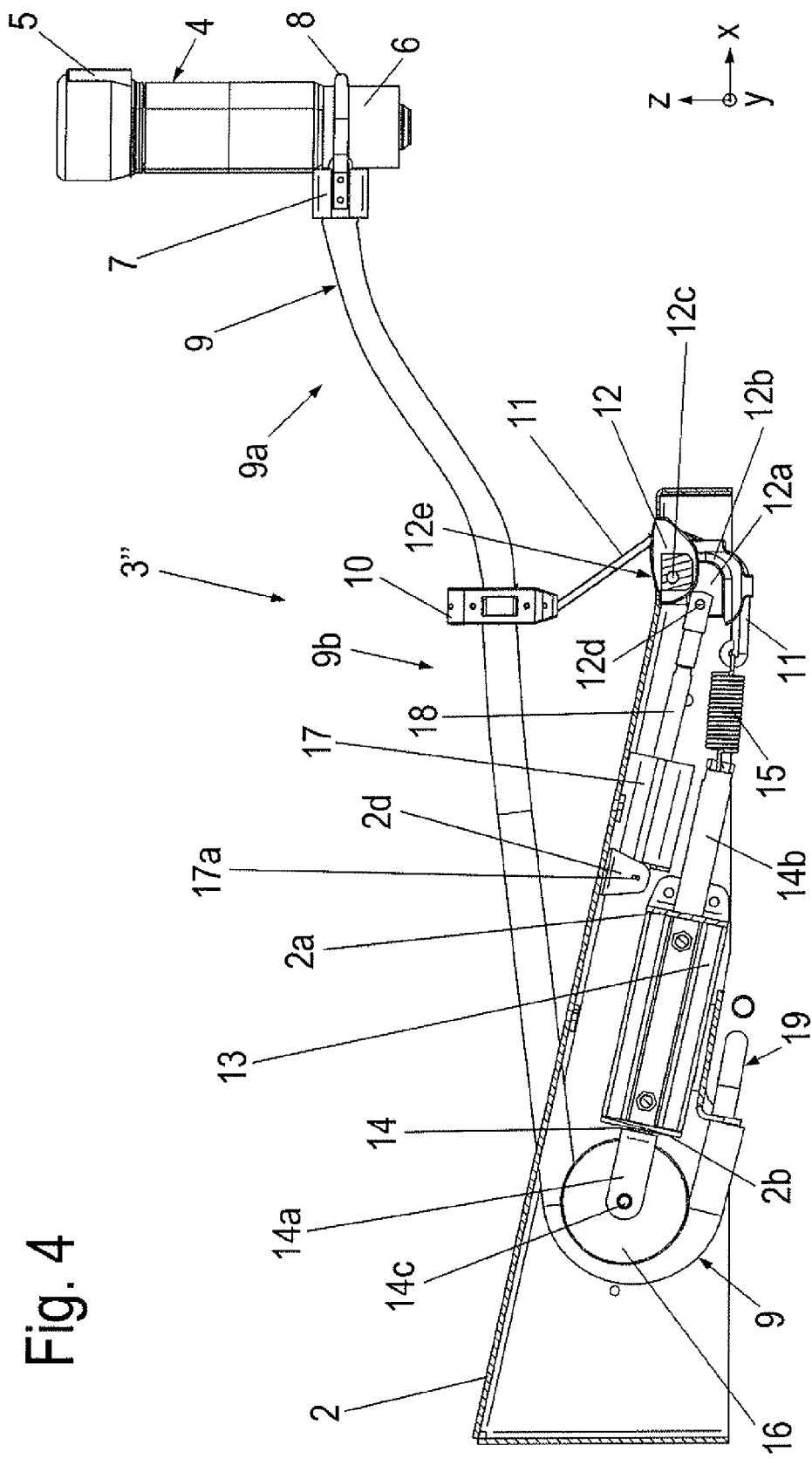
FIG. 4 shows a schematic longitudinal sectional representation of the teat cup unit of the milking cluster according to FIG. 1 in a milking position.

FIG. 3 shows a schematic longitudinal sectional representation of the teat cup unit 3 or 3' of the milking cluster 1 according to FIG. 1 in a park position.

The park position shown in FIG. 3 is achieved in a simple manner from the positioning position shown in FIG. 2 as a result of the pivot drive device 17 extending the pivot rod 18 and pivoting the fixing piece 12 about the pivot axis 12c. For this purpose, the pivot rod 18 is extended to the front side of the housing 2 (which is on the left in FIG. 3) and the fixing piece 12 is pivoted clockwise about the y-axis such that the teat cup 4 is pivoted toward the top surface of the housing 2. At the same time, the force-storing element 15 is additionally tensioned, which results in increasing the tensile force in the flexible element 11 and increases the fixing of the hose guide 10 in the receiving means 12e of the fixing piece. The force-storing element 15 thus also serves for necessary length compensation between the piston rod 14 and the flexible element 11. It is obviously possible by adapting the associated components for the teat cup 4 to be positioned almost horizontally in the park position.

Said park position is assumed in a non-used state of the milking cluster 1. In addition, when positioning the teat cup 4, the remaining ones remain in the park position. In addition, at the end of a milking operation of a teat cup 4, said teat cup is moved back into the park position. Contamination of the teat opening of the head 5 is only slight in the park position.

When in the positioning position the teat cup 4 is connected to a predetermined teat of the animal to be milked in an almost perpendicular position, the milking position of the teat cup unit 3" is assumed, which is shown in FIG. 4 in a schematic longitudinal sectional representation of the teat cup unit 3" of the milking cluster 1 according to FIG. 1.

To assume the milking position, the piston rod 14 of the drive device 13 is extended in the direction of the front side of the housing 2, the guide roller 16 being moved away from the rear side of the housing 2 in the x-direction and slackening the double hose 9. At the same time, the flexible element 11 is relaxed, as a result of which the hose guide 10 is released out of the receiving means 12e of the fixing piece 12. As a result, a large degree of free mobility of the teat cup 4 is produced. The teat cup 4, which is fixedly sucked on the teat of the animal to be milked, is consequently connected to the housing 2 of the milking cluster 1 only by means of the double hose 9. As the double hose 9 is only light in weight, no tensile forces are exerted on the teat cup 4.

In addition, a lateral freedom of movement in the y-direction for approaching and positioning the other teat cups 4 is also made possible as the teat cup 4, which is already situated in the milking position, by means of the double hose 9 does not provide any obstruction and through the further positioning operations does not bring about any additional pulling forces on the udder or teat of the animal to be milked.

Figure 5B:
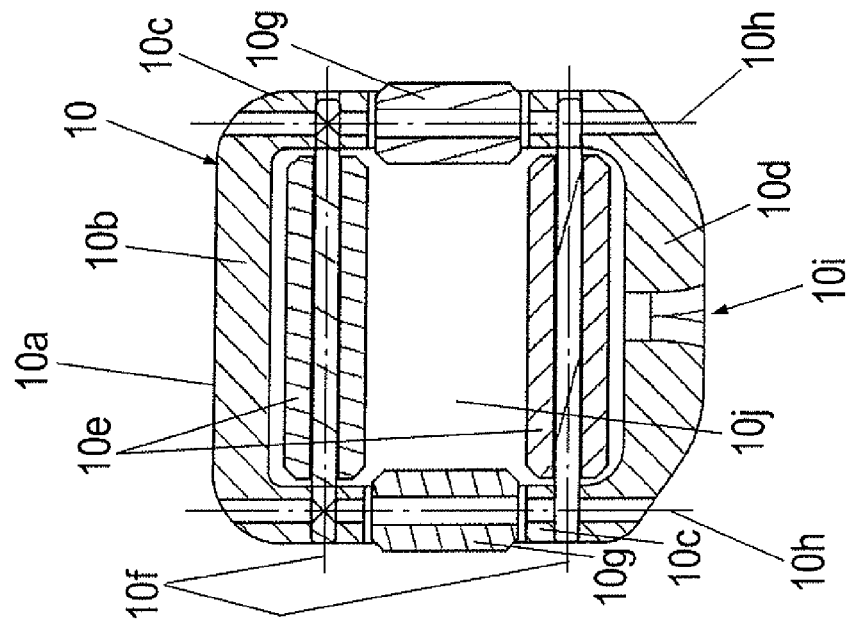
FIGS. 5, 5a and 5b show representations of a hose guide.
Figure 5A:
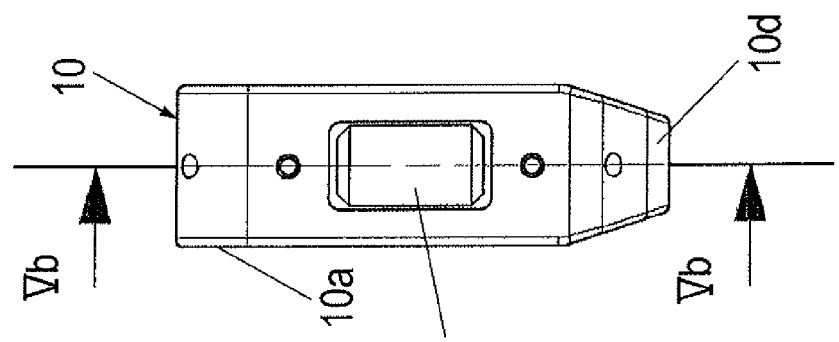
Figure 5:
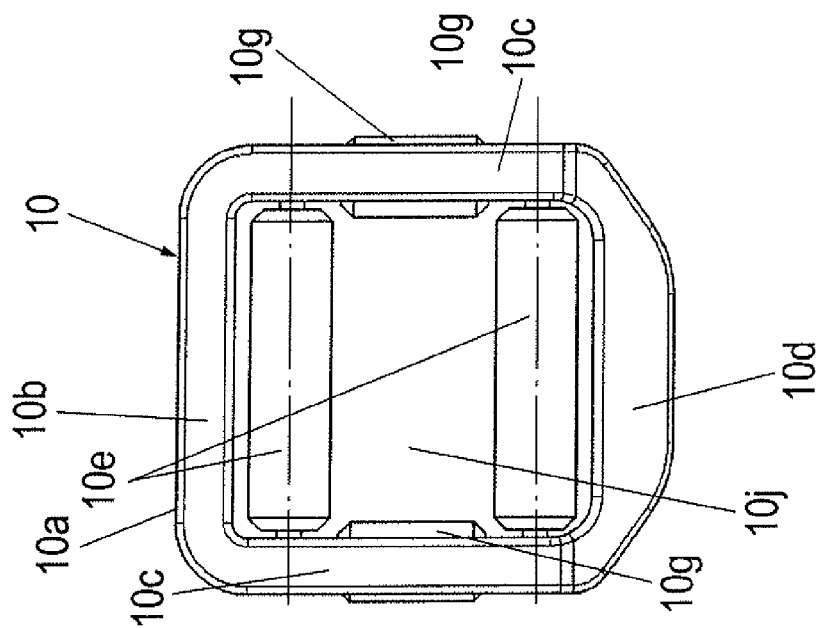

FIGS. 5, 5a and 5b show representations of the hose guide 10.

FIG. 5 shows a view in the direction of the double hose 9 in the x-direction, FIG. 5a shows a side view in the y-direction and FIG. 5b shows a sectional view in the y-z plane along the line VII from FIG. 5a.

The hose guide 10 has a body 10a with a substantially square shape. The body 10a comprises an upper cross part 10b, two side parts 10c and a foot part 10d. The foot part 10d and the cross part 10b are arranged parallel to one another and are connected together at their ends in each case by a side part 10c, as a result of which they prescribe a passage 10j for the double hose 9. A horizontal roller 10e is arranged in each case in the passage 10j below the cross part 10b and above the foot part 10d. Each horizontal roller 10e is rotatable about a horizontal roller axis 10f which extends in the y-direction. A vertical roller 10g is arranged in each side part 10c so as to be rotatable about a respective vertical roller axis 10h, the vertical roller axes 10h extending in the z-direction and being arranged at right angles to the horizontal roller axes 10f. The horizontal rollers 10e and the vertical rollers 10g serve to guide the double hose 9 in a low-friction manner in the passage 10j. Free axial mobility of the hose guide 10 on the double hose 9 or in relation to one another is possible as a result. The horizontal rollers 10e and the vertical rollers 10g are in this case realized as cylindrical rollers. Other forms, e.g. spherical rollers or coated rollers are naturally possible.

The foot part 10d is thickened downward in the z-direction and is tapered downward in the x-direction (FIG. 5a). It serves for insertion in the receiving means 12e of the fixing piece 12. In addition, a fastening portion 10i for fastening the end of the flexible element 11 is provided in the thickened foot part 10d of the hose guide 10.

Figure 6:
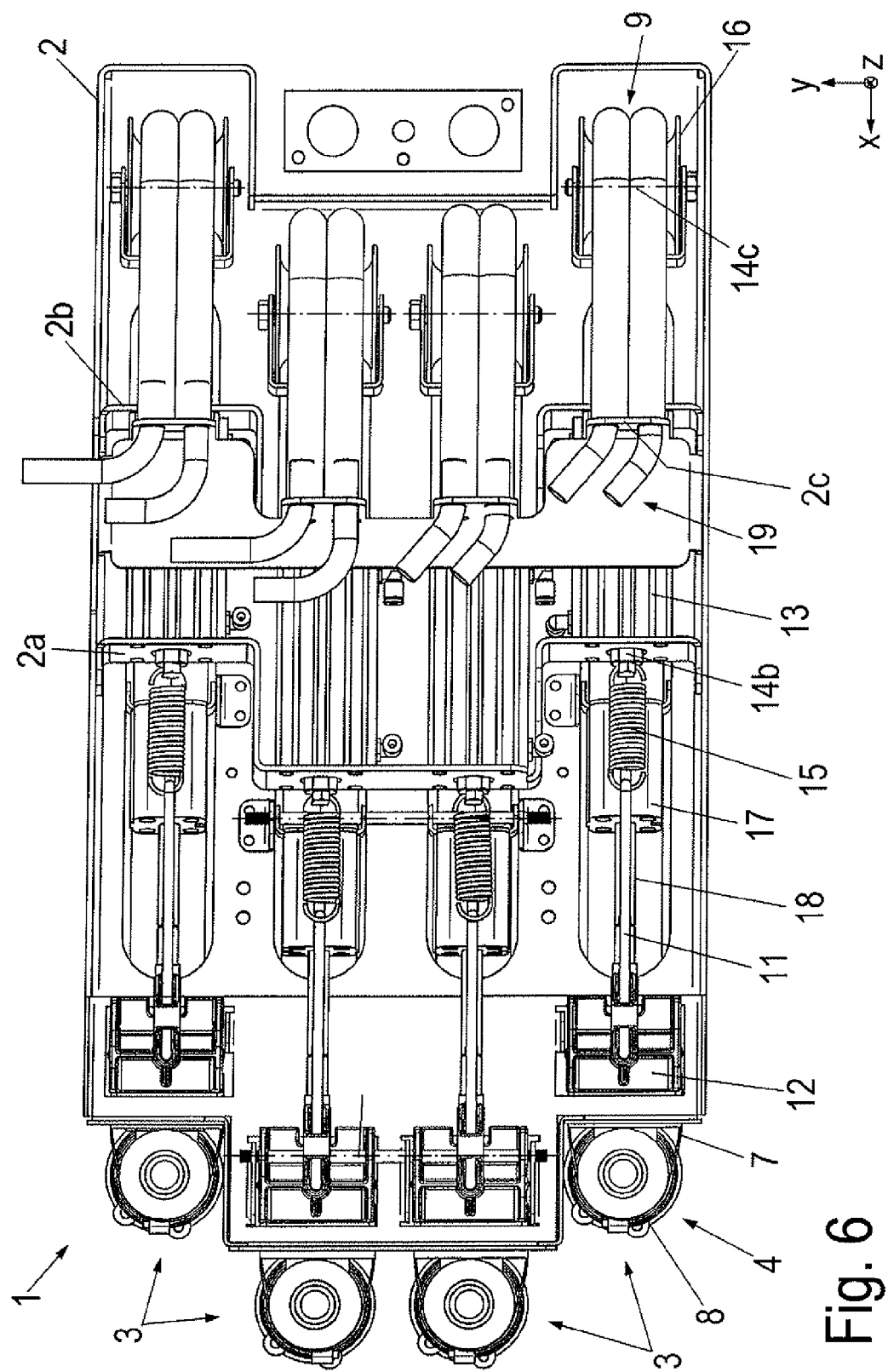
FIG. 6 shows a schematic view of the milking cluster according to FIG. 1 from below.

FIG. 6 shows a schematic view of the milking cluster 1 according to FIG. 1 from below, it being possible to see the arrangement of the various function units and elements.

References have only been given on the bottom teat cup unit 3. The housing 2 is open from the bottom. It is naturally also possible for each teat cup unit 3 to have its own housing, which are arranged side by side in the y-direction and, for example, are also pivotable about the y-axis toward one another or are flexibly pivotable to a certain extent. The inner teat cup units 3 are arranged at a spacing in front of the outer teat cup units 3 in the x-direction, as a result of which a feed path during the positioning operation is able to be minimized. In addition, two hose nipples 19 can be seen in each case.

Figure 7:
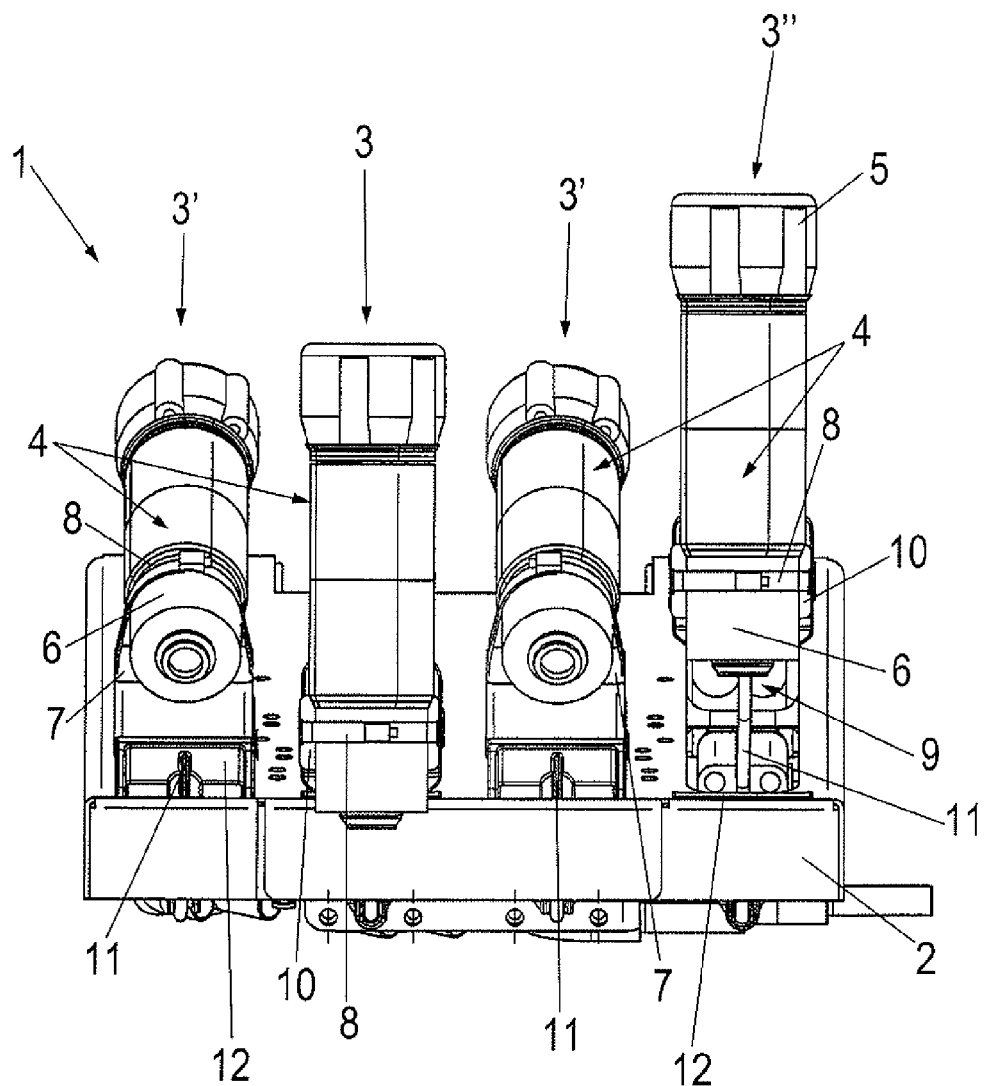
FIG. 7 shows a schematic view of the milking cluster according to FIG. 1 from the side of the teat cup.

FIG. 7 shows a schematic view of the milking cluster 1 according to FIG. 1 from the side of the teat cup 4. i.e. from the front side of the housing 2.

The teat cup units 3, 3', 3" are shown here in the different positions. The teat cup units 3' are situated in the park position. In the case of the teat cup unit 3, the teat cup 4 is in the upright position in the positioning position. The teat cup unit 3" located on the outside on the right is in the milking position with the double hose 9 released.

It can clearly be seen in FIG. 7 that the teat cup 4 of the teat cup unit 3" in the milking position stands higher in the z-direction than the teat cup 4 in the positioning position and the pivoted-around teat cup 4 in the park position. When the other teat cups 4 are positioned, the milking cluster 1 is also able to be moved—as already mentioned above—to a certain extent in the y-direction as a result of the slackened double hose 9 without any forces being exerted on the teat cup 4 which is in the milking position.

Figure 8:
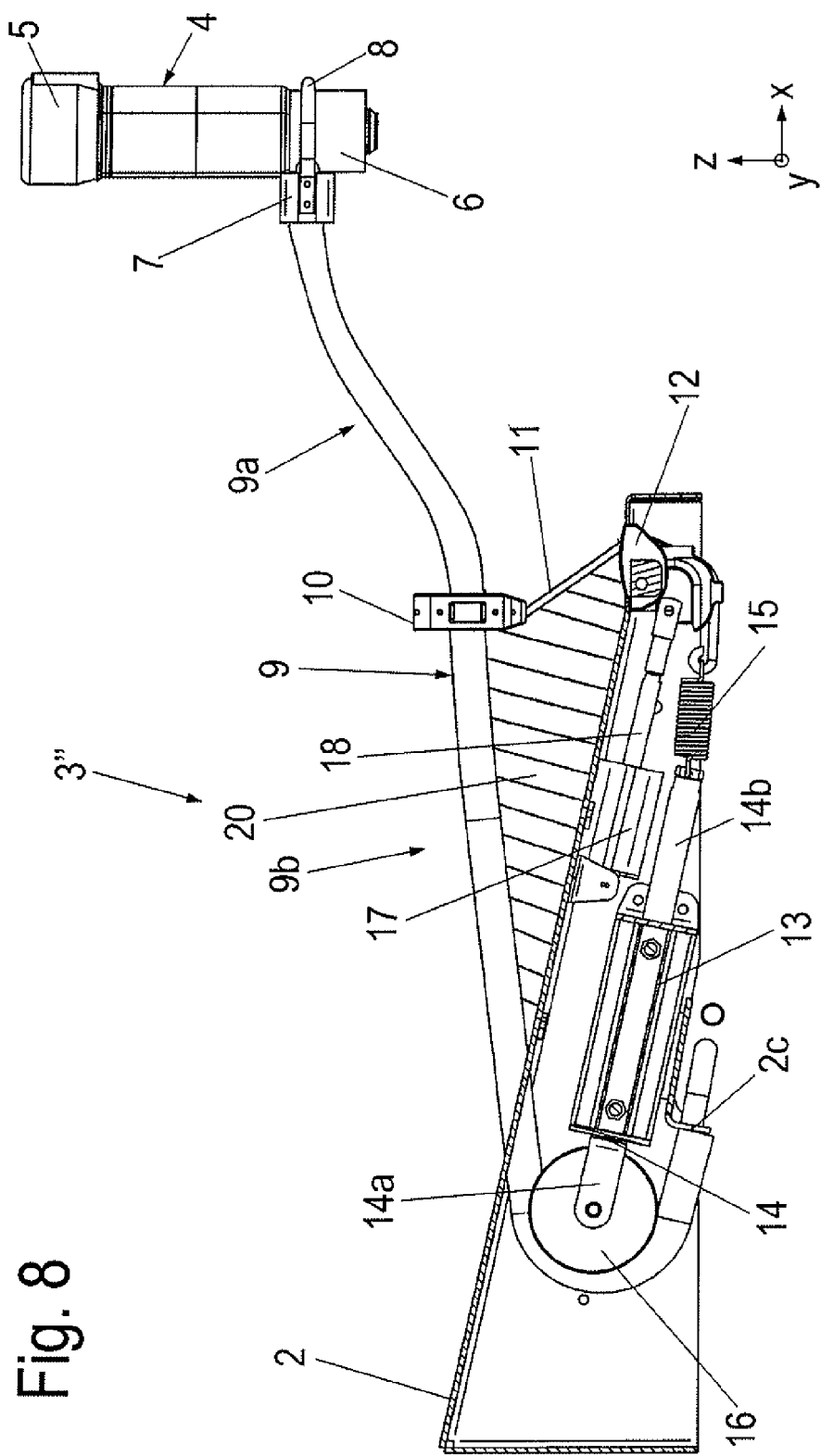
FIGS. 8 and 9 show representations of the teat cup unit of the milking cluster in the milking position to explain double hose portions.
Figure 9:
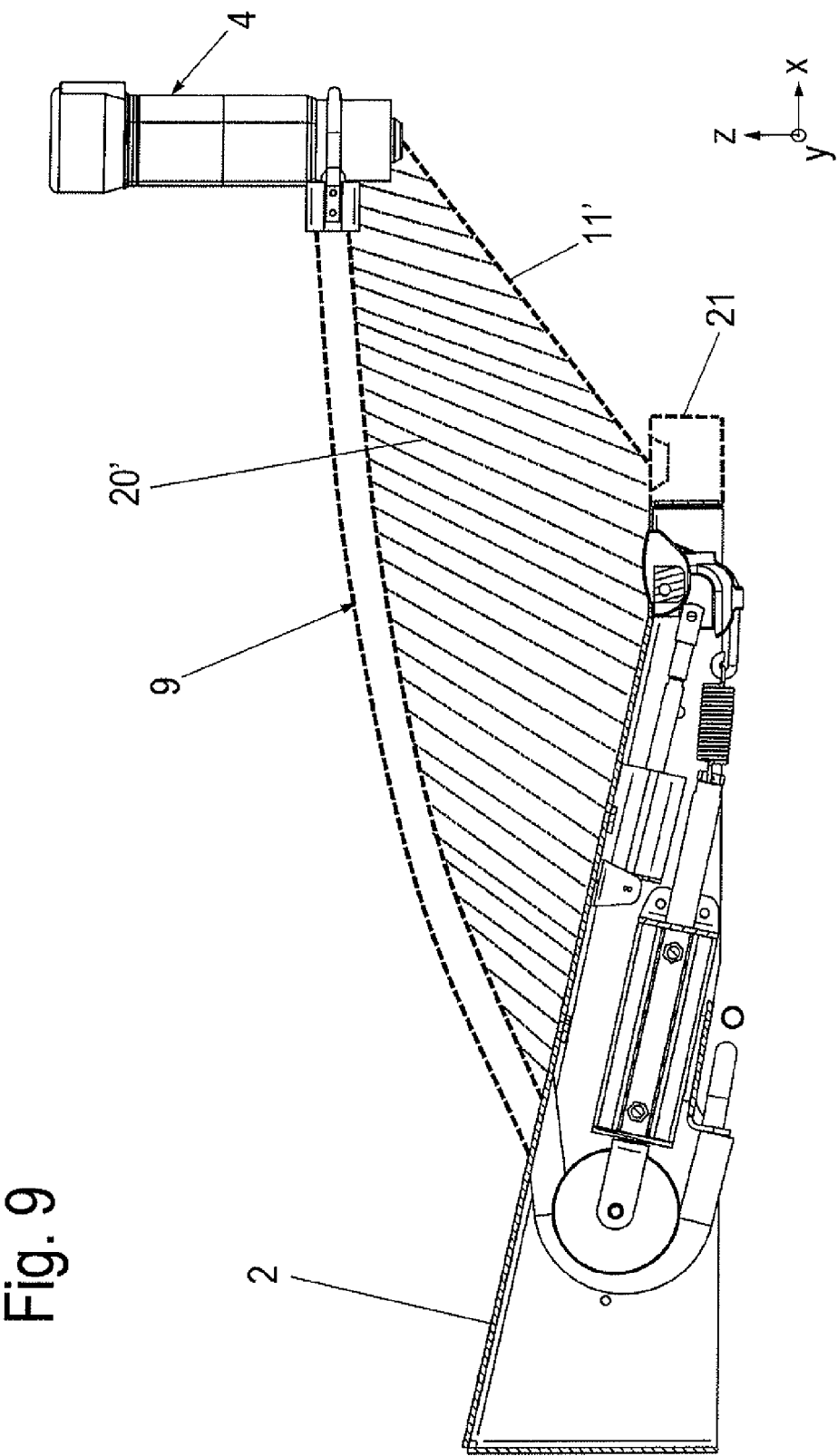

FIGS. 8 and 9 are representations of the teat cup unit 3" of the milking cluster in the milking position to explain regions fixed by the double hose.

In the milking position, the respective teat cup 4 at one free hose end 9a of the double hose 9, with a relatively small exposed length of the flexible element 11 and consequently of the hose guide 10, is provided with a large degree of free mobility. The reason for this lies in the double release of double hose 9 and hose guide 10, especially as the hose guide 10—as already explained in detail above—is developed such that it is freely movable axially on the double hose 9.

A great advantage additionally in the case of said construction is that any fouling of the flexible element 11 and of the double hose 9 with adjacent teat cup units 3, 3', 3" is minimized. It is almost impossible for an adjacent teat cup 4 to pass into the hatched region, which is defined by the top side of the housing 2, a hose boundary 9b of the double hose 9 and the flexible element 11. If the flexible element 11' were to be arranged directly on the teat cup 4 and a holder piece 21, as shown in FIG. 9, the risk is considerably greater as a result of the larger region 20' hatched in FIG. 9.

Assuming the park position (FIG. 3) from the milking position (FIG. 4) is effected by means of firstly assuming the positioning position (FIG. 2) by the piston rod 14 of the drive device 13 extending with the guide roller 16 again in the direction toward the rear side of the housing 2 and retracting with the tensile end 14b. In this case, at the same time the hose guide 10 is pulled into the conical receiving means 12e of the fixing piece 12 and the teat cup 4 is pulled against the hose guide 10 by means of the double hose 9, which is tensioned again by means of the guide roller 16 moving back. As a result, once the milking operation is terminated the teat cup 4 is pulled from the associated teat and fixed. This is also effected when the teat cup 4 is trailing (out of line) from the animal to be milked or has fallen off.

Figure 10:
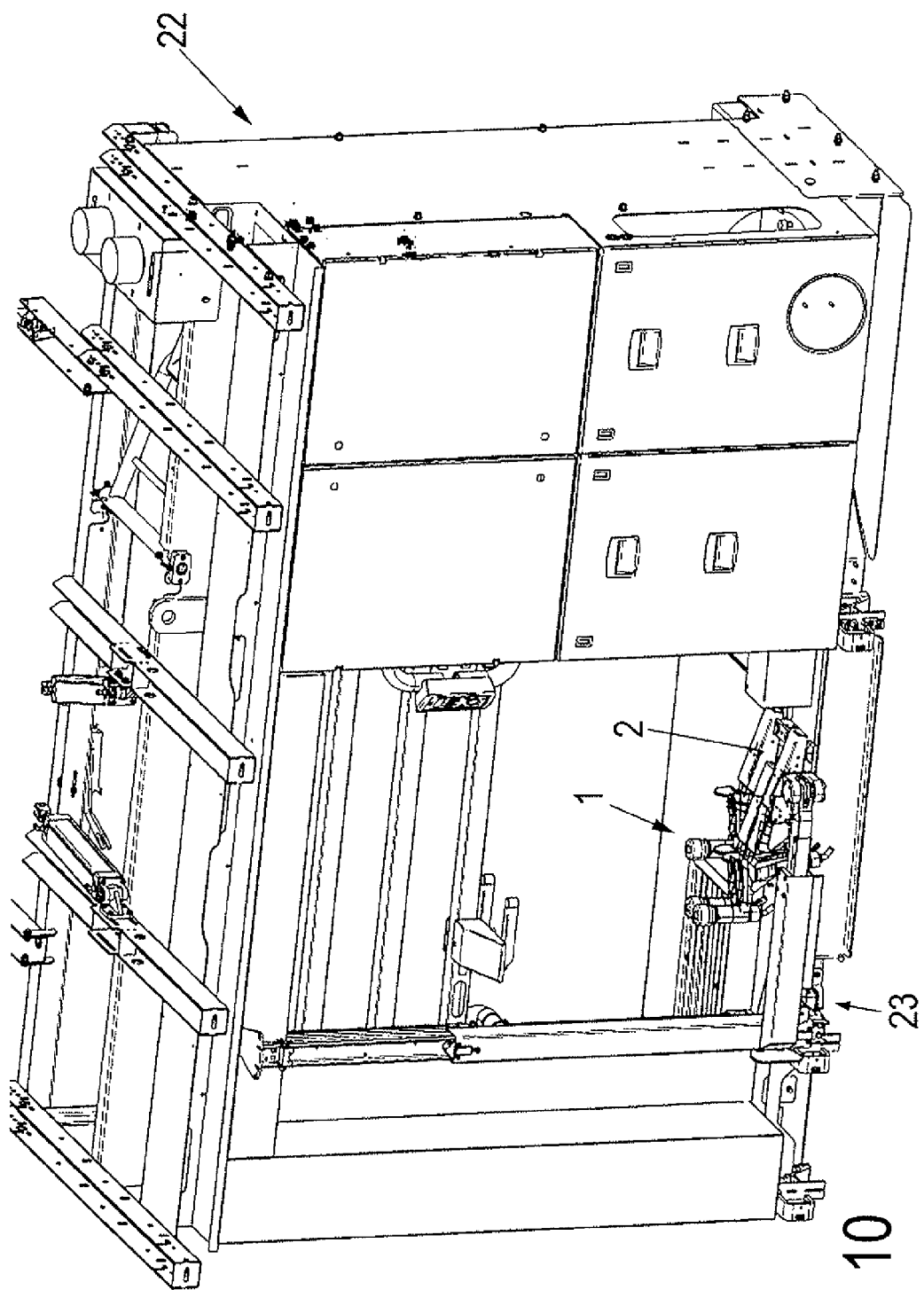
FIG. 10 shows a perspective representation of a milking parlor.

Finally, FIG. 10 shows a perspective representation of a milking parlor 22 with the milking cluster 1 and the housing 2. The milking cluster 2, in this case, is attached on a supporting arm device 23 which is actuatable to assume different positions for milking and for setting the different positions of the teat cup units 3, 3', 3" automatically or by a robot (not shown). Several such milking parlors 22 can be arranged in a row and can be operated by one single robot.

The milking cluster 1 can also be mounted on a robot arm.

The function of the support arm device 23 is to carry the milking cluster 1 in a balanced manner and to run smoothly such that it follows the movements of the animal to be milked.

If the milking cluster 1 is fastened on such a support arm device 23, a robot arm is docked onto the support arm device 23 for automatically positioning the teat cup 4. The robot arm moves the support arm device 23 or a support arm thereof together with the milking cluster 1 to the teats of the animal to be milked and positions the teat cups 4 one after another on the associated teats. As soon as all the teats have been positioned, the robot arm is detached from the support arm and, where applicable, moves to a next milking parlor location in order to position the teat cups 4 there. During the milking stage, the teat cups 4 hang with the milking cluster 1 from the support arm which follows the movements of the animal. As soon as the milk flow of one teat is exhausted, the corresponding teat cup 4 is pulled from the teat and moved into the park position to protect it against ingress of dirt. As soon as all teat cups have been removed and are in the park position, the support arm pivots with the milking cluster 1 from the position under the animal into the position next to the animal such that the animal is able to leave the milking parlor.

As the teat cup units 3 can be used and actuated individually and independently of one another, they can naturally also be used for milk-producing animals with udders which have a different number of teats, for example, 3 or 4.

The invention is not limited to the exemplary embodiments shown above, but can be modified within the framework of the accompanying claims.

Thus, for example, the double hose 9 can also be realized as a multiple hose.

The invention claimed is:

1. A milking cluster for a milking parlor for milking milk-producing animals, the milking cluster comprising:
   a teat cup unit having:
      a housing;
      a teat cup;
      a hose arrangement operatively engaged with the teat cup;
      a moveable hose guide operatively joined to the housing to move between a fixed position and a released position spaced apart from the housing and including a plurality of rollers operatively engaged with the hose arrangement; and
      a drive device operatively engaged with the housing, the moveable hose guide, and the hose arrangement.

2. The milking cluster of claim 1, wherein the moveable hose guide further comprises:
   an upper cross part, a plurality of side parts and a foot part; the foot part connected to the cross part by the side parts, thereby defining a passage for the hose arrangement.

3. The milking cluster of claim 2, wherein the foot part and the cross part are disposed substantially parallel to one another.

4. The milking cluster of claim 2, wherein at least one roller is disposed at least partially in the passage.

5. The milking cluster of claim 2, wherein at least one roller is disposed at least partially in a side part.

6. The milking cluster of claim 1, wherein the moveable hose guide is pivotable in the fixed position, and the milking cluster further comprises:
a flexible element joined to the moveable hose guide for movement with the moveable hose guide between the fixed position and the released position spaced apart from the housing.

7. The milking cluster of claim 1, wherein the drive device defines a first position that tensions the hose arrangement into abutment against the moveable hose guide when the moveable hose guide is in the fixed position; and a second position wherein the hose arrangement is not tensioned and the moveable hose guide is in the released position spaced apart from the housing.

8. The milking cluster of claim 1, wherein the drive device further comprises:
an adjustable guide roller operatively connected to the hose arrangement and to the moveable hose guide by a flexible element for moving the teat cup unit between a positioning position and a milking position.

9. The milking cluster of claim 1, and further comprising:
a pivot drive operatively engaged with the teat cup to pivot the teat cup between a positioning position and a park position.

10. The milking cluster of claim 1, and further comprising:
a pivotable hose guide receiver engaged with the moveable hose guide when the moveable hose guide is in the fixed position; and
a pivot drive operatively engaged with the moveable hose guide and moveable between a positioning position and a park position.

11. The milking cluster of claim 10, and further comprising:
a flexible element guided by a guide portion of the hose guide receiver.

12. The milking cluster of claim 1, wherein the hose arrangement at least partially includes a multiple hose.

13. The milking cluster of claim 12, wherein the multiple hose comprises a double hose.

14. A milking parlor for milking milk-producing animals, said milking parlor comprising a milking cluster for a milking parlor for milking milk-producing animals, the milking cluster comprising:
a teat cup unit having:
a housing;
a teat cup;
a hose arrangement operatively engaged with the teat cup;
a drive device operatively engaged with the housing and the hose arrangement, and;
a moveable hose guide operatively joined to the hose arrangement to move between a fixed position and a released position spaced apart from the housing, and including a plurality of rollers operatively engaged with the hose arrangement.

15. The milking cluster of claim 1, wherein:
the moveable hose guide is pivotable between a positioning position and a park position when the moveable hose guide is in the fixed position.

16. The milking cluster of claim 1, wherein:
the released position comprises a milking position.

17. The milking cluster of claim 1, and further comprising:
a pivotable hose guide receiver engaged with the moveable hose guide when the moveable hose guide is in the fixed position, and the hose guide receiver is pivotable between a park position and a positioning position, and the hose guide receiver is unengaged with the moveable hose guide when the moveable hose guide is in the released position spaced apart from the housing.

18. The milking cluster of claim 1, and further comprising:
a flexible element engaged between the drive device and the movable hose guide.

19. The milking cluster of claim 1, and further comprising:
a flexible element engaged between the drive device and the moveable hose guide to move the moveable hose guide from the released position spaced apart from the housing to the fixed position.

20. The milking cluster of claim 14, and further comprising:
a pivot drive operatively engaged with the teat cup to pivot the teat cup between a positioning position and a park position.

21. The milking cluster of claim 1, and further comprising:
a hose guide receiver operatively engaged with the moveable hose guide when the moveable hose guide is in the fixed position, and unengaged with the moveable hose guide when the moveable hose guide is in the released position; and
a pivot drive operatively engaged with the teat cup, the moveable hose guide, and the hose guide receiver to pivot the teat cup, the moveable hose guide, and the hose guide receiver between a positioning position and a park position.

22. The milking parlor of claim 14, wherein:
the moveable hose guide is pivotable between a positioning position and a park position when the moveable hose guide is in the fixed position.

23. The milking parlor of claim 14, wherein:
the released position comprises a milking position.

24. The milking parlor of claim 14, and further comprising:
a pivotable hose guide receiver engaged with the moveable hose guide when the moveable hose guide is in the fixed position, and the hose guide receiver is pivotable between a park position and a positioning position, and the hose guide receiver is unengaged with the moveable hose guide when the moveable hose guide is in the released position.

* * * * *